(12) United States Patent
Kuebler

(10) Patent No.: US 10,966,366 B2
(45) Date of Patent: Apr. 6, 2021

(54) PORTABLE HYDRAULIC CONNECTION AND CONTROL ASSEMBLY

(71) Applicant: CNH Industrial America LLC, New Holland, PA (US)

(72) Inventor: Marvin D. Kuebler, Goodfield, IN (US)

(73) Assignee: CNH Industrial America LLC, New Holland, PA (US)

( * ) Notice: Subject to any disclaimer, the term of this patent is extended or adjusted under 35 U.S.C. 154(b) by 168 days.

(21) Appl. No.: 16/215,022

(22) Filed: Dec. 10, 2018

(65) Prior Publication Data

US 2020/0178456 A1    Jun. 11, 2020

(51) Int. Cl.
*F04B 51/00* (2006.01)
*B66F 9/22* (2006.01)
(Continued)

(52) U.S. Cl.
CPC ........ *A01B 73/044* (2013.01); *B66F 9/07504* (2013.01); *B66F 9/22* (2013.01);
(Continued)

(58) Field of Classification Search
CPC ........ F04B 51/00; F04B 49/065; F04B 49/06; F04B 17/03; F04B 2201/0802; F04B 49/10; F04B 13/00; F04B 19/22; F04B 2205/09; F04B 23/021; F04B 43/02; F04B 47/00; F04B 49/08; F04B 49/103; F04B 49/106; F04B 49/22; F04B 53/10; F04B 15/02; F04B 2201/0201; F04B 2201/0202; F04B 2201/0405; F04B 2201/0601; F04B 2201/1211; F04B 2203/0208; F04B 2203/0209; F04B 2205/04; F04B 2205/05;
(Continued)

(56) References Cited

U.S. PATENT DOCUMENTS 2,364,709 A    12/1944   Greer
D194,588 S      2/1963   Brock
(Continued)

FOREIGN PATENT DOCUMENTS

CN    105003490 A    10/2015
CN    105465073 A  *  4/2016
WO    WO-0026561 A1 *  5/2000 ......... F16H 61/0031

OTHER PUBLICATIONS

"Hydraulic Test Benches" from GB Barberi, AviationPros, retrieved from: http://www.aviationpros.com/product/12081693/gb-barberi-new-pending-content, Jul. 28, 2017 (2 pages).
(Continued)

*Primary Examiner* — Andre J Allen
(74) *Attorney, Agent, or Firm* — Rebecca L. Henkel; Rickard K. DeMille

(57) ABSTRACT

A portable frame is configured to be transported by the forks of a fork lift truck and has hydraulic lines releasably connectable to the auxiliary hydraulic fluid pressure system of the fork lift truck. A valve and a set of hydraulic lines are mounted on the portable frame for releasable connection to the hydraulic fluid lines of a tillage machine so that an inexpensive fork lift truck may be utilized to test operation of hydraulically actuated tillage components.

20 Claims, 3 Drawing Sheets

(51) Int. Cl.

| | | |
|---|---|---|
| *A01B 73/04* | (2006.01) | |
| *B66F 9/075* | (2006.01) | |
| *F15B 19/00* | (2006.01) | |
| *F16L 37/00* | (2006.01) | |

(52) U.S. Cl.
CPC .............. *F04B 51/00* (2013.01); *F15B 19/00* (2013.01); *F16L 37/00* (2013.01)

(58) Field of Classification Search
CPC ............ F04B 2205/13; F04B 2207/043; F04B 2207/701; F04B 2207/702; F04B 23/02; F04B 23/04; F04B 23/06; F04B 33/005; F04B 35/01; F04B 35/04; F04B 37/14; F04B 39/0292; F04B 39/08; F04B 39/10; F04B 39/1073; F04B 39/12; F04B 39/121; F04B 43/0081; F04B 43/073; F04B 43/0736; F04B 47/026; F04B 47/028; F04B 49/025; F04B 49/04; F04B 49/225; F04B 53/1082; F04B 53/14; F04B 53/144; F04B 53/16; F04B 5/02; F04B 7/0076; F04B 7/02; F04D 15/0088; F04D 13/086; F04D 13/12; F04D 15/0005; F04D 15/0227; F04D 27/001; F04D 13/068; F04D 13/14; F04D 15/0094; F04D 15/0272; F04D 19/04; F04D 19/042; F04D 1/06; F04D 27/009; F04D 27/02; F04D 29/668; F04D 29/669; F04D 5/002; F15B 19/005; F15B 15/2807; F15B 15/2846; F15B 15/2884; F15B 1/24; F15B 2201/205; F15B 2201/31; F15B 2201/515; F15B 15/14; F15B 15/2815; F15B 15/2853; F15B 15/2876; F15B 15/2892; F15B 19/00; F15B 19/002; F15B 1/08; F15B 1/103; F15B 1/165; F15B 20/00; F15B 2201/3152; F15B 2211/20546; F15B 2211/20576; F15B 2211/6306; F15B 2211/633; F15B 2211/6336; F15B 2211/6652; F15B 2211/855; G01F 23/74; G01F 15/005; G01F 1/26; G01F 1/34; G01F 15/04; G01F 15/06; G01F 15/14; G01F 1/06; G01F 1/24; G01F 1/44; G01F 1/46; G01F 1/56; G01F 1/68; G01F 1/69; G01F 23/00; G01F 23/0076; G01F 25/0007; G01F 25/0015; G01F 3/16
USPC .......................................................... 73/168
See application file for complete search history.

(56) References Cited

U.S. PATENT DOCUMENTS

| | | | |
|---|---|---|---|
| 4,126,038 | A | 11/1978 | Bartlett et al. |
| 4,480,464 | A | 11/1984 | Whisenand et al. |
| 4,735,380 | A | 4/1988 | Barousse et al. |
| 5,678,982 | A | 10/1997 | Schwaiger |
| 6,349,601 | B1 | 2/2002 | Losee |
| 6,691,435 | B1 | 2/2004 | Schultz et al. |
| 6,862,940 | B2 | 3/2005 | Romano |
| 8,408,326 | B2 | 4/2013 | Yuen et al. |
| 9,641,047 | B2 | 5/2017 | Collett et al. |
| 9,664,578 | B2 | 5/2017 | Mateo et al. |
| 10,285,323 | B2 * | 5/2019 | Wileniec ............. A01B 73/046 |
| 10,495,220 | B2 * | 12/2019 | Boisvert ................ F16H 61/47 |
| 2009/0202370 | A1 * | 8/2009 | Fujii ................... H01M 16/006 417/411 |
| 2014/0116735 | A1 * | 5/2014 | Bassett .................... A01C 5/06 172/2 |
| 2016/0212928 | A1 * | 7/2016 | Wileniec ............. A01B 73/046 |
| 2016/0212929 | A1 * | 7/2016 | Wileniec ............. A01B 63/22 |
| 2020/0221628 | A1 * | 7/2020 | Blunier ................ A01B 73/046 |

OTHER PUBLICATIONS

"Portable Hydraulic Test Stand", DK Manufacutring LLC, retrieved from: http://www.dkent.org/products/htsp.html, Jul. 28, 2017 (1 page).

* cited by examiner

PORTABLE HYDRAULIC CONNECTION AND CONTROL ASSEMBLY

FIELD OF THE INVENTION

The present invention pertains to hydraulic control systems and, more specifically, to portable hydraulic control systems.

BACKGROUND OF THE INVENTION

Agricultural implements such as tillage implements are large and difficult to test without a pressurized hydraulic fluid control system. Typical tillage machines can reach up to 60 feet spans that are lateral to the direction of movement through a field. To achieve this span, but still enable the implement to be transportable on public roads, the frames for such implements are articulated having center sections and one or more wing sections pivotally connected to the center section. Since the wing sections are heavy and carry heavy tillage components, hydraulic actuators are required to fold in between the deployed field position and the folded transport position. The actuators for such wing sections, as well as the actuators for establishing the height of the equipment, have pairs of hydraulic fluid lines connectable to the opposite ends of an actuator piston. This is to alternately pressurize the actuator to extend or retract it, thus pivoting the wing sections. In field operation, the hydraulic fluid under pressure is supplied from a control system mounted on a tractor and multiple quick disconnect connections for each of the pairs of hydraulic fluid lines for the tillage implement.

While this is appropriate and effective for operation in the field as well as transport operation, there are times when tillage implements need to be moved and/or tested within the storage area of a dealer or other facility. While the functionality of testing the apparatus may be performed by a tractor in the storage area of such a facility, the tractor is an extremely expensive piece of equipment and in many cases it can be difficult to maneuver around the sometimes confined spaces of a storage area.

Accordingly, what is needed in the art is a portable hydraulic control system that that is inexpensive and can be easily maneuvered in a dealership or manufacturing facility.

SUMMARY OF THE INVENTION

Exemplary embodiments of the present disclosure provide a portable hydraulic connection and control assembly which may be mounted on a work machine to interface with the hydraulic fluid actuation system of an agricultural implement.

In some embodiments of the present disclosure, a portable hydraulic connection and control assembly is provided for connection to the auxiliary hydraulic fluid pressure system of a mobile work vehicle. The portable hydraulic control system includes a frame configured to be transported by the mobile work vehicle and a first set of hydraulic fluid lines configured to be releasably connected to the auxiliary hydraulic fluid pressure system of the mobile work vehicle and configured to be releasably connected to a hydraulically activated component. A valve is interposed in said first set of hydraulic fluid lines and mounted on said frame and has at least a pair of hydraulic fluid inputs and a pair of hydraulic fluid outputs to control flow of hydraulic fluid through said first set of hydraulic fluid lines.

In another form, the present disclosure is an apparatus including a mobile work vehicle with an auxiliary hydraulic fluid pressure system and releasable fluid output connectors and a hydraulically actuated component having releasable hydraulic fluid input connectors for actuation of the hydraulically actuated component. A frame is configured to be transported by the mobile work vehicle. A first set of hydraulic fluid lines is configured to be releasably connected to the hydraulic fluid pressure output connectors of the mobile work vehicle and configured to be releasably connected to the hydraulic fluid input connectors of the hydraulically actuated component. A valve is mounted on the frame and has at least a pair of hydraulic fluid inputs and at least a pair of hydraulic fluid outputs so that a hydraulically actuated component may be activated from the hydraulic fluid pressure system of said mobile work vehicle.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

Figure 1:
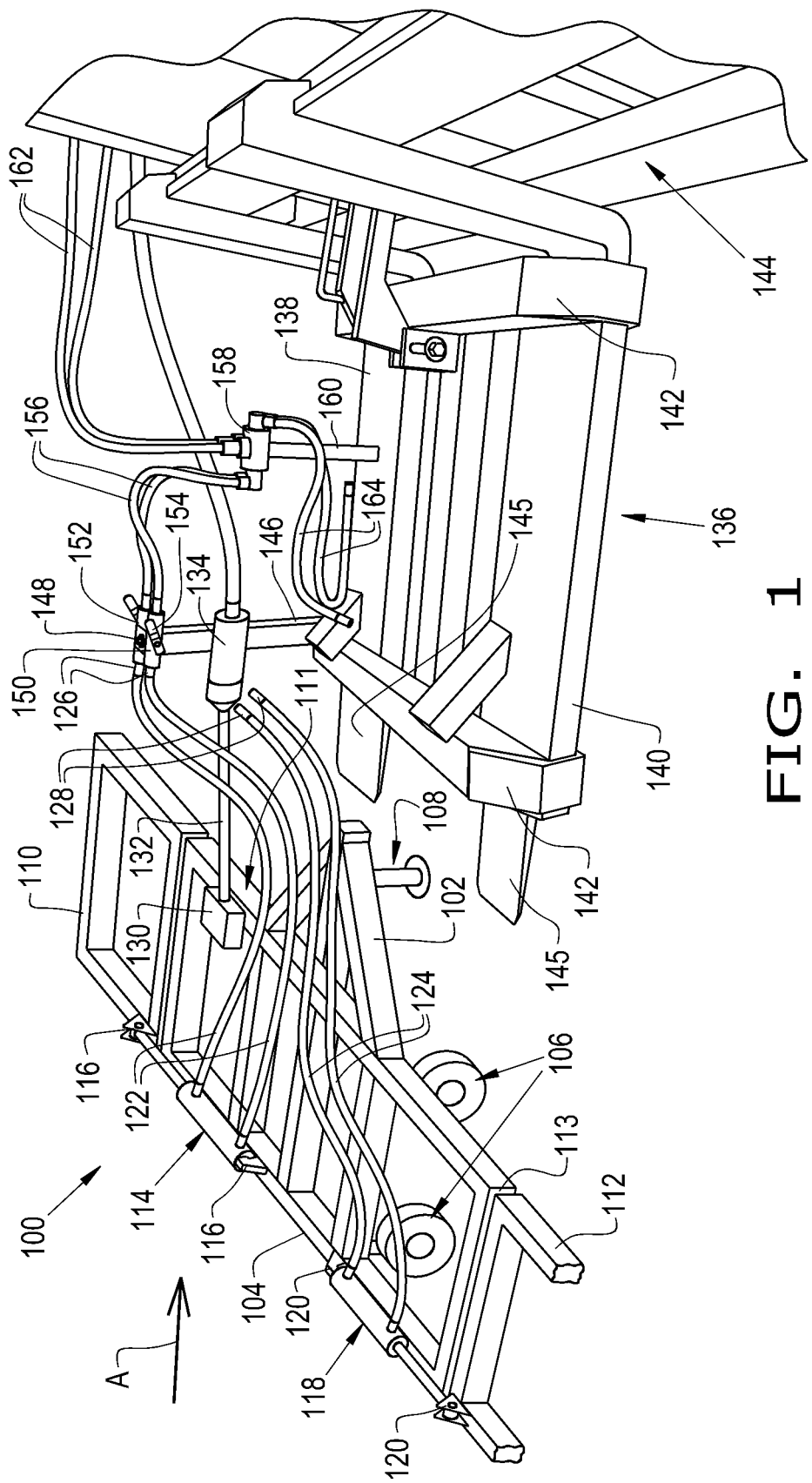
FIG. 1 shows a perspective view of an agricultural implement with which the present invention may be utilized along with a mobile work vehicle and a side view of the portable hydraulic control and connection system of the present invention.

Referring specifically to FIG. 1, there is shown an agricultural implement 100 in the form of a tillage implement having a hitch 102 for connection with a towing vehicle such as a tractor and connected with a central frame 104. Central frame 104 has a plurality of ground support wheel assemblies 106, only a portion of which are shown for allowing the tillage implement to be transported over a field. Ground support wheel assemblies 106 are adjustable to establish different heights of central frame 104 above the ground. Although the ground support wheel assemblies 106 may be actuated by other means, it is typical that they are adjusted using actuators coupled to a source of hydraulic pressure (not shown). The hitch 102 has a support post 108 which stabilizes the tillage implement when it is in a storage yard. Central frame 104 has a left wing frame 110 pivotally connected to central frame 104 at a pivotal connection 111 that extends generally parallel to the direction of movement A of the tillage implement 104. A right wing frame 112 is connected to central frame 104 at a pivotal connection 113, also extending generally parallel to the direction of movement A of the tillage implement 100.

Left and right wing frames 110 and 112, respectively, are pivoted between the illustrated field position and a retracted transport or storage position. The pivoting of frame 110 is through an actuator assembly 114 pivotally connected to the center frame 104 and left wing frame 110 at pivotal connections 116. The pivoting of right wing frame 112 is provided by an actuator assembly 118 pivotally connected to center frame 104 and right wing frame 112 at pivotal connections 120. As illustrated, actuator assemblies 114 and 118 utilize fluid pressure in the form of hydraulic fluid to extend and retract the actuator. Turning first to actuator assembly 118, hydraulic fluid pressure lines 124 extend to both ends of the actuator to cause an internal piston (not shown) to translate and thus extend or retract an actuating rod. Hydraulic fluid pressure lines 124 are flexible and terminate in male quick disconnect couplings 128. Actuator assembly 114 utilizes hydraulic fluid pressure lines 122 terminating in male quick disconnect couplings 126. In some cases, the tillage implement 100 requires electrical power and this is supplied to a schematically illustrated junction box 30 by an electrical input cable 132 terminating in a releasable electrical connector 134.

As stated previously, the tillage implement 100 may have additional wing sections beyond the right and left wing section frames 110 and 112. This causes the necessity of having the frames fold for transport or storage conditions. The frames 110, 104 and 112 typically mount tillage components to break up and prepare the soil. These are not shown to enable a clearer focus on the present invention. The implement 100 may also be other than a tillage implement and in the form of a planter, seeder or like implement. When the tillage implement 100 is stored in a production or sales facility, it is necessary at times to determine whether the implement is properly functioning through the hydraulic fluid actuation system and the electrical system, if so equipped. In the field and transport to the field the hydraulic and electrical functions would be supplied from a tractor which will have multiple hydraulic fluid outlets according to the number of actuating assemblies or actuating systems on the implement. It is an expensive proposition to utilize a tractor with multiple hydraulic fluid outlets in a storage facility due to the operating costs. In addition, it may be difficult to maneuver large tractors for use in the field in the crowded conditions in a storage facility.

Figure 2:
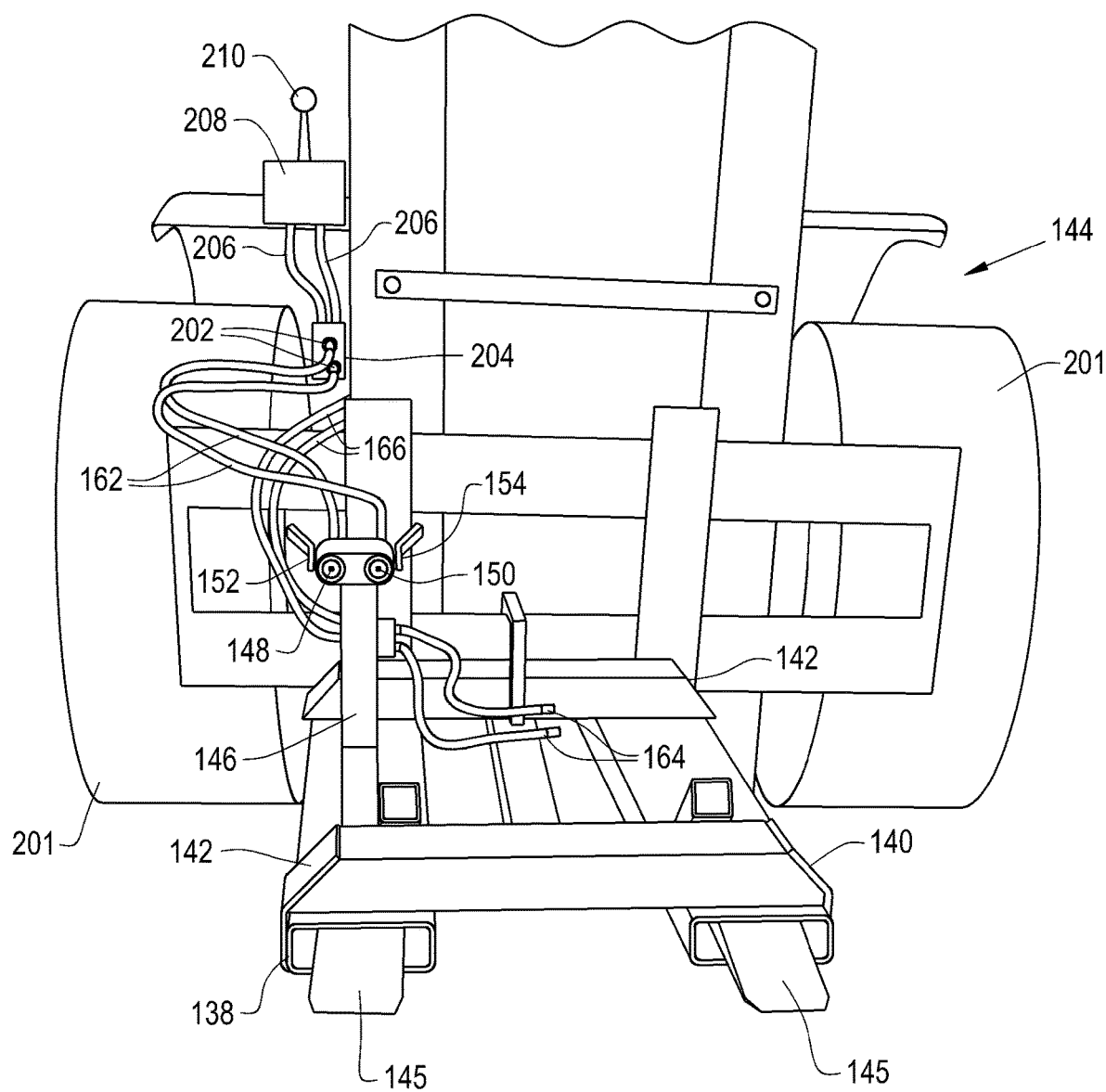
FIG. 2 is an end view of the mobile work vehicle of FIG. 1 along with the portable hydraulic control and connection assembly of the present invention.

Accordingly, the present invention described in FIGS. 1 and 2 is provided to enable utilization with a forklift truck 144, commonly found in all manufacturing and sales facilities. A portable hydraulic connection and control assembly 136 includes a left tubular frame member 138 and a right tubular frame member 140. The right and left tubular fame members are structurally connected by cross frame members 142 to space them for portability by the forklift truck 144, as described below. As shown, the tubular frame members 138 and 140 have a rectangular cross section but may have a range of configurations. A post 146 extends vertically from left tubular frame member 138 and supports a quick disconnect female couplings 148 and 150, particularly shown in FIG. 2. Post 146 elevates the couplings 148 and 150 to position them approximately at a position similar to the position of the corresponding hydraulic control inputs on a tractor. Quick disconnect female couplings 148 and 150 connect to a left valve 152 and right valve 154, respectively. A set of hydraulic fluid lines 156 extends from valves 152 and 154 to a optional selector valve 158 mounted on post 160 that is structurally supported by left tubular frame member 138. A set of hydraulic fluid lines 162 are connected to and provide an input to selector valve 158. Selector valve 158 connects hydraulic fluid lines 162 to the hydraulic fluid lines 156 or to a set of auxiliary hydraulic fluid lines 164. It is to be noted that in some conditions the selector valve 158 may not be utilized and that the sets hydraulic fluid lines 162 and 156 may be merged into one that can be referred to as a first set of hydraulic fluid lines. The auxiliary hydraulic fluid lines 164 may be referred to as a second set of hydraulic fluid lines. The set of hydraulic fluid lines 162 terminate in hydraulic fluid connectors in the form of a male quick disconnect connectors 166 as shown in FIG. 2.

Turning now to FIG. 2 particularly, the forklift truck 144 is mobile through the use of wheels 201. Forklift truck 144 can be maneuvered throughout a storage facility with the use of an appropriate power unit which drives the forklift truck around a storage facility. The forklift truck 144 incorporates forks 145 which are carried by the forklift truck 144 and that can be elevated to raise or lower or support various objects. Typically, the forks 145 have a rectangular cross section which corresponds to the rectangular cross section of the tubular frame members 138 and 140. The details of the actuation mechanism for the forks 145 and the mechanism for maneuvering the forklift truck 144 are not described to enable a clear understanding of the present invention.

The forklift truck 144, has in many cases, an auxiliary hydraulic fluid system quick disconnect female coupling 202 in line with valves 204, shown in the form of ON/OFF valves. Hydraulic fluid lines 206 extend from valves 204 to a hydraulic fluid control valve assembly 208 operated through the use of an appropriate operator control lever 210. The control valve 208, in usual fashion, alternatively pressurizes the hydraulic fluid lines 206 to extend or retract an actuator connected to the system. Usually, the control valve 208 is part of an overall system that includes a motor driven pump receiving hydraulic fluid from a reservoir and maintaining it at a regulated pressure to be available for the alternate pressurization of the hydraulic fluid lines.

In operation, the agricultural tillage implement 144 may be at a sales or production storage location along with other such implements. In order to test the functioning of the actuators and other components of the agricultural tillage implement 100 in a cost effective way, the forklift truck 144 is maneuvered so that the forks 145 will be received in the left and right tubular frame members 138 and 140 to lift and transport the portable hydraulic connection and control assembly 136 to the location of the agricultural tillage implement 144. The hydraulic fluid lines 162 are connected to the female quick disconnect elements 202 and the valves 204 are turned to an ON position permitting communication between the hydraulic fluid control valve 208 and the hydraulic lines on the portable hydraulic connection and control assembly 136. The selector valve 158, if so provided, is oriented so that there is hydraulic fluid communication between lines 162 and 156. A set of hydraulic fluid lines, shown as left hydraulic lines 122 on agricultural tillage implement 100 is connected to the quick disconnect female couplings 148 and 150. The left and right valves 152 and 154 are then turned to an open position so that the hydraulic fluid lines 122 are in fluid communication with the hydraulic fluid control valve 208. In this condition, the operator control lever 210 may be manipulated to alternatively pressurize the lines 122 to extend or retract the actuator 114 and determine whether it is functioning properly, in addition to other functions of leveling an implement. When the testing of actuator 114 is finished, the lines 122 are disconnected and lines 124 are then inserted into the quick disconnect female couplings 148 and 150. Actuator 115 may then be tested. It is contemplated that there will be as many actuators on agricultural tillage implement 100 as there are frames and components to articulate so that each actuator desired to be tested is sequentially inserted in the quick disconnect couplings for actuation by the hydraulic fluid control valve 208.

The electrical connector 134 is also available to connect the junction box 130 on agricultural tillage implement 100 to the electrical power source 212 on forklift 144 through electrical line 214.

Because the portable hydraulic connection and control assembly 136 is portable through the use of a forklift truck, it is possible to conveniently and effectively test the hydraulic components of an agricultural tillage implement anywhere in a storage yard. The essence of a forklift truck 144 is its extreme maneuverability which is advantageous when the agricultural tillage implements are closely stored to one another. This provides a distinct advantage over the use of a tractor which is substantially larger and more difficult to place and maneuver in restricted spaces. By utilizing the control system of the forklift truck 144, the valves may simply be a passive but easily connectable conduit to the control system of the forklift truck 144. This provides the functionality to the actuators without any additional cost and complexity.

Figure 3:
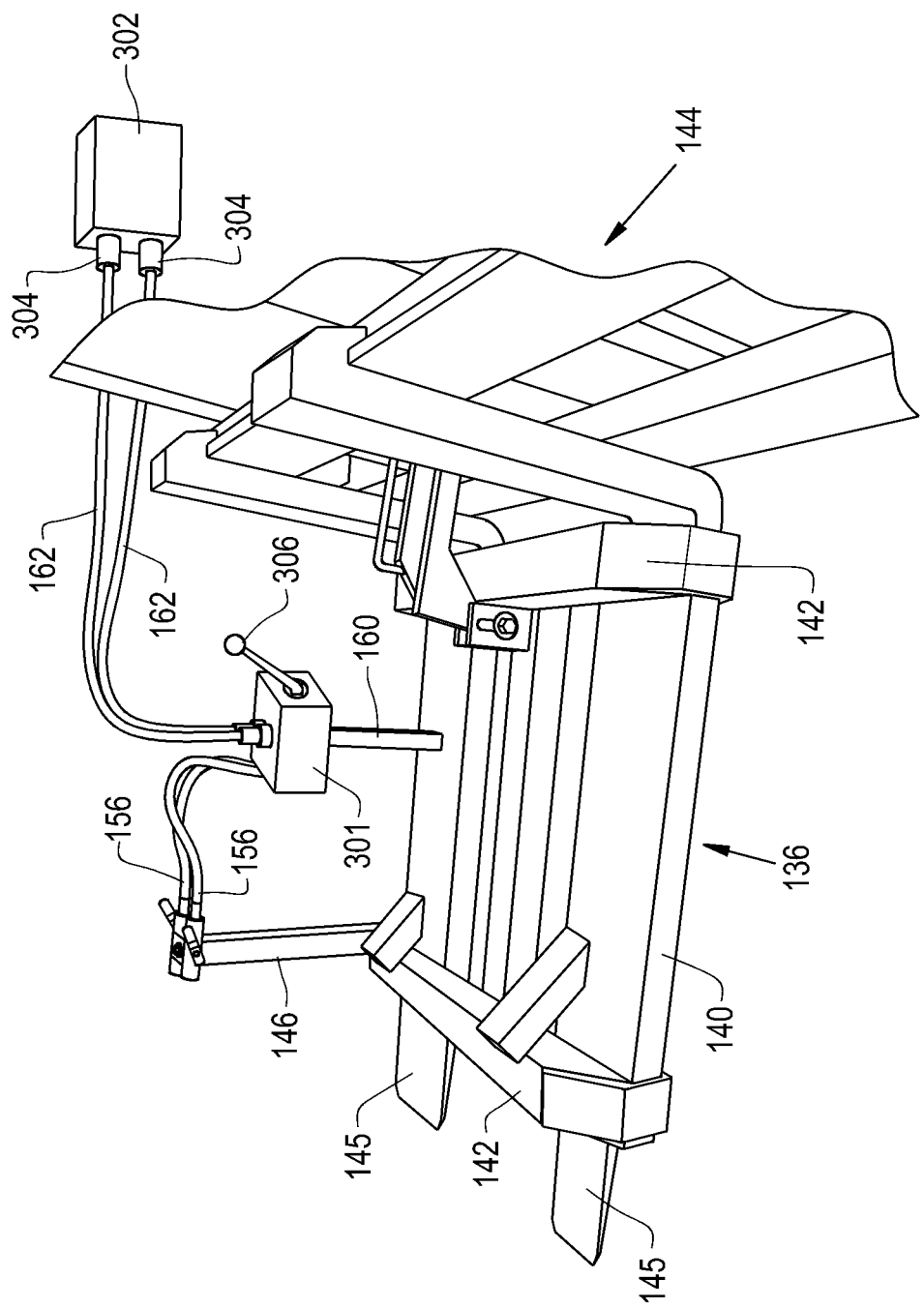
FIG. 3 is a side view of an alternate form of the portable control and connection system of the present invention.

In the event that it is desired to provide actual control on the portable hydraulic connection and control assembly 136, the arrangement shown in FIG. 3 is provided. A control valve 301 is interposed in between the hydraulic fluid lines 156 and 162. The hydraulic lines 162 extend to quick disconnect female couplings 304 on a pressurized hydraulic fluid source 302. The pressurized hydraulic fluid source 302 is mounted on the forklift 144 and pressurizes fluid and maintains pressurized hydraulic fluid in one of the conduits 162 and provides a return line in the other of the hydraulic fluid conduits 162. In this embodiment, the alternate pressurization of conduits 156 to actuate and operate a hydraulic actuator connected to it is operated by control valve 301. An operator control lever 306 enables the pressurized hydraulic fluid to pass through one of the hydraulic fluid lines and returns through the other to displace an actuator. This arrangement allows manipulation of the actuators on the portable hydraulic connector and control assembly 32 without having to go to the operator station in the forklift truck 144.

In both embodiments the actuators of agricultural and other hydraulically actuated implements can easily be tested within the confines of a storage facility.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A portable hydraulic connection and control assembly for connection to an auxiliary hydraulic pressure system of a mobile work vehicle configured to pull a hydraulically actuated component, said portable hydraulic control system comprising:
   a frame configured to be transported by the mobile work vehicle;
   a first set of hydraulic fluid lines carried by said frame and configured to be releasably connected to the auxiliary hydraulic pressure system of said mobile work vehicle and configured to be releasably connected to the hydraulically actuated component; and,
   a valve interposed in said first set of hydraulic fluid lines and mounted on said frame and having at least a pair of hydraulic fluid inputs and a pair of hydraulic fluid outputs to control flow of hydraulic fluid through said first set of hydraulic fluid lines.

2. The portable hydraulic connection and control assembly as claimed in claim 1, wherein said work vehicle is a fork lift truck and said frame is configured to accept the forks of said fork lift truck.

3. The portable hydraulic connection and control assembly as claimed in claim 2, wherein said frame comprises spaced parallel tubular structural elements to receive the forks of the fork lift truck.

4. The portable hydraulic connection and control assembly as claimed in claim 3, further comprising cross frames extending between and structurally connecting said tubular members.

5. The portable hydraulic connection and control assembly as claimed in claim 1, wherein said first set of hydraulic fluid lines have quick disconnect ends.

6. The portable hydraulic connection and control assembly as claimed in claim 5, wherein said first set of hydraulic lines has a male quick disc connect coupling for connection with said hydraulic system of said mobile work vehicle and a female quick disconnect coupling for connection to the hydraulically actuated component.

7. The portable hydraulic connection and control assembly as claimed in claim 1, wherein said valve is an on/off valve.

8. The portable hydraulic connection and control assembly as claimed in claim 7, wherein an on/off valve is provided separately for each of said first set of hydraulic fluid lines.

9. The portable hydraulic connection and control assembly as claimed in claim 8, wherein said valve comprises a valve housing having first and second passages formed therethrough with threaded openings for connection with said first and second sets of hydraulic fluid lines and rotary on/off valves positioned in said housing for pivoting between a totally closed position and an on position permitting full flow therethrough.

10. The portable hydraulic connection and control assembly as claimed in claim 1, further comprising:
    a selector valve interposed in said first set of hydraulic fluid lines between said valve and the auxiliary hydraulic fluid pressure system of said mobile work vehicle; and
    a second set of hydraulic fluid lines connected to said selector valve, said selector valve configured to selectively connect the auxiliary hydraulic fluid pressure system to the hydraulically actuated component or said second set of hydraulic fluid lines.

11. Apparatus comprising:
    a mobile work vehicle having an auxiliary hydraulic fluid pressure system with releasable hydraulic fluid output connectors;
    a hydraulically actuated component having at least one set of releasable hydraulic fluid input connectors for actuation of said hydraulically actuated component;
    a frame configured to be transported by said mobile work vehicle;
    a first set of hydraulic fluid lines carried by said frame and configured to be releasably connected to said releasable hydraulic fluid output connectors of said mobile work vehicle and configured to be and releasably connected to said hydraulic fluid input connectors of said hydraulically actuated component; and,
    a valve interposed in said first set of hydraulic fluid lines and mounted on said frame and having at least a pair of hydraulic fluid inputs and at least a pair of hydraulic fluid outputs to control flow of hydraulic fluid through said first set of hydraulic fluid lines;

whereby said hydraulically actuated component is configured to be activated from the auxiliary hydraulic fluid pressure system of said mobile work vehicle.

12. The apparatus as claimed in claim 11, wherein said mobile work vehicle is a fork lift truck having forks and said frame is configured to receive said forks.

13. The apparatus as claimed in claim 12, wherein said frame comprises spaced tubular members receiving said forks in their interior.

14. The apparatus as claimed in claim 13, wherein said frame further comprises at least one cross frame connecting said spaced tubular members, said tubular members oriented to be spaced from and parallel to one another.

15. The apparatus as claimed in claim 11, wherein said first set of hydraulic fluid lines have quick disconnect ends.

16. The apparatus as claimed in claim 15, wherein said first set of hydraulic lines has a male quick disc connect coupling for connection with said hydraulic fluid pressure system of said mobile work vehicle and a female quick disconnect coupling for connection to the hydraulically actuated component.

17. The apparatus as claimed in claim 11, wherein said valve is an on/off valve.

18. The apparatus as claimed in claim 11, wherein said hydraulically actuated component has a plurality of sets of hydraulic fluid lines and said first set of hydraulic fluid lines is selectively releasably connectable to each one of said set of hydraulic fluid lines on said hydraulically actuated component.

19. The apparatus as claimed in claim 17, wherein said hydraulically actuated component is a tillage component having a plurality of pivotal frames, each having sets of hydraulic fluid lines for selectable releasable connection to said first set of hydraulic fluid lines.

20. The apparatus as claimed in claim 11, further comprising:
an electrical line mounted on said frame and having one end releasably connectable with an electrical system of said mobile work vehicle and the other end to an electrical junction box on said hydraulically actuated component.

* * * * *